Aug. 1, 1972 W. D. KOMHYR 3,681,228
ELECTROCHEMICAL CONCENTRATION CELL FOR GAS ANALYSIS
Filed Feb. 6, 1969
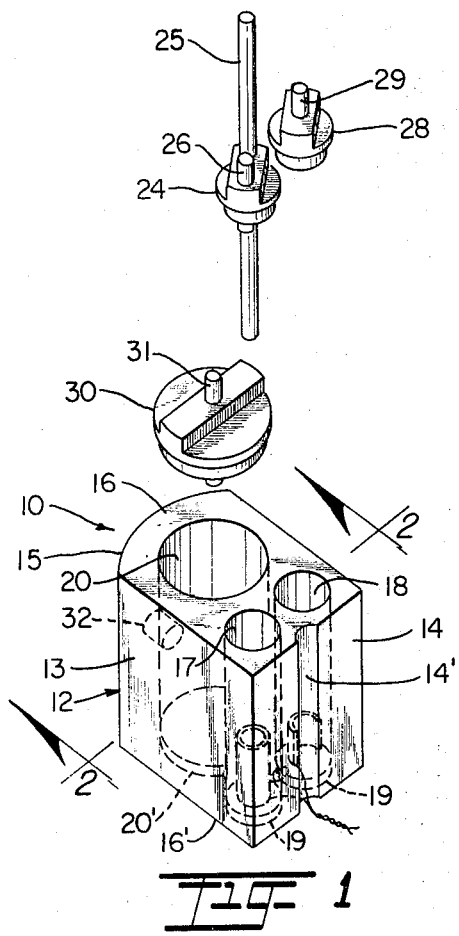
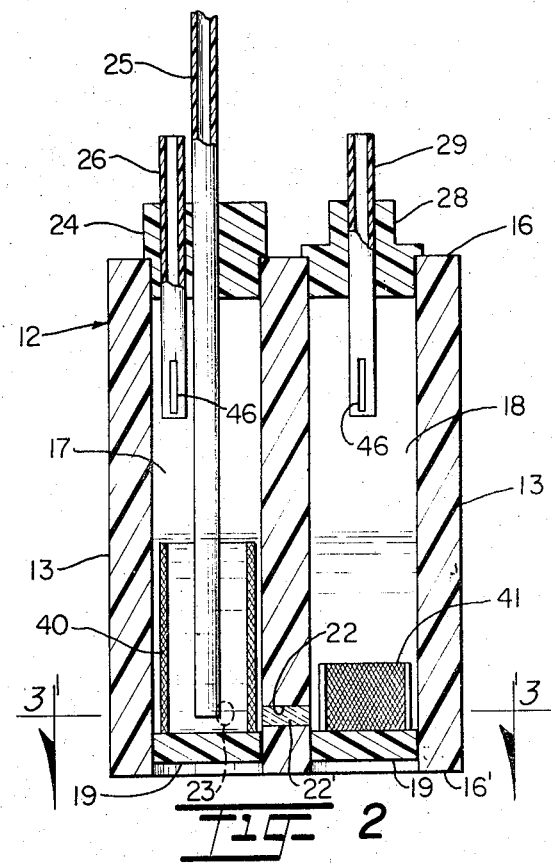
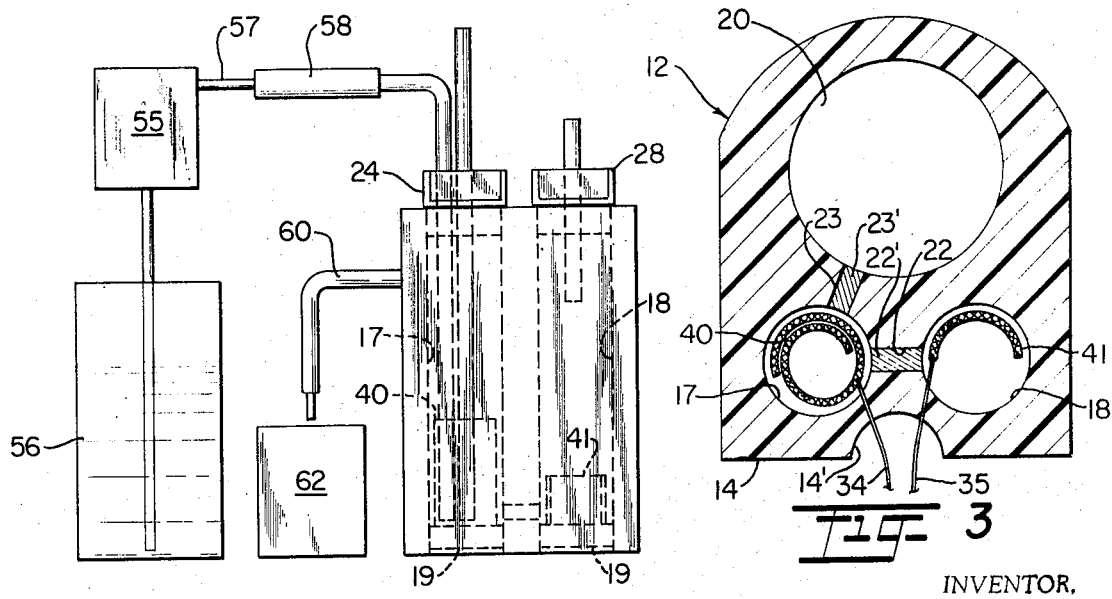
INVENTOR.
WALTER D. KOMHYR
BY John E. Reilly
ATTORNEY "United States Patent Office" 3,681,228
Patented Aug. 1, 1972

3,681,228
ELECTROCHEMICAL CONCENTRATION CELL FOR GAS ANALYSIS
Walter D. Komhyr, 70 Manhattan Drive, Boulder, Colo. 80302
Filed Feb. 6, 1969, Ser. No. 797,189
Int. Cl. G01n 27/46
U.S. Cl. 204—195 R   10 Claims

ABSTRACT OF THE DISCLOSURE

An electrochemical concentration cell for gas analysis is made up of an integral cell body composed of an inert material and which is provided with openings defining separate anode and cathode chambers, the chambers being linked together by an ion bridge disposed in an opening formed between the chambers, and a larger opening defining a reservoir chamber communicates with the cathode chamber to automatically maintain a predetermined level of solution electrolyte in the cathode chamber for portable cell applications. In non-portable cell applications, a separate pumping system may be utilized in place of the reservoir chamber to maintain a predetermined solution level over a long time period. In sampling air for the presence of selected trace atmospheric constituents, the anode and cathode are defined by platinum electrodes immersed in potassium iodide solutions of different concentrations in each of the chambers, and a slotted air exhaust tube in the cathode chamber minimizes loss of the solution electrolyte in atmospheric testing.

---

This invention relates to a new and useful concentration cell for gas analysis, and more particularly relates to an electrochemical concentration cell being adaptable for use in the continuous measurement of oxidants, halogens, and other gas species that either liberate or consume halogens according to well-known chemical reactions.

It is customary in air pollution studies to measure oxidants in the atmosphere by means of galvanic cells in which air is bubbled through a halide solution electrolyte and the resultant chemical reaction between the oxidant and the halide solution generates a measurable electric current that is proportional in magnitude to the rate at which the oxidant enters the cell. Such galvanic cells are also sensitive to halogens. In addition, they may be adapted for the measurement of gas species other than oxidants and halogens that are capable of liberating halogens through chemical action as, for example, when carbon monoxide reacts with iodine pentoxide to liberate iodine. The measurement of reductants such as sulfur dioxide may also be accomplished by measuring the rate of consumption of halogen by the reducing species within such cells.

For a galvanic cell suited for the types of gas measurements described above, reference is made to my copending application for patent entitled "Platinum-Halide-Carbon Cell for Sensing Ozone," Ser. No. 494,988, filed Oct. 11, 1965, now U.S. Pat. No. 3,428,542, wherein there is set forth and described a cell having separate anode and cathode chambers partially filled with a halide solution electrolyte and with a platinum cathode and a powdered carbon anode therein. When the anode and cathode are connected to an external load and the air to be measured is introduced into the cathode chamber, the current flow rate through the external load is substantially proportional to the ozone concentration in the air. In accordance with the present invention, a novel concentration cell has been devised which avoids contamination of the cell that occurs, for example, when powdered carbon is inadvertently introduced into the cathode chamber of the platinum-halide-carbon cell, operates without the use of an external battery or other power source, and provides accurate, positive and negative readings from the cell reaction depending on whether an oxidant or reductant gas is being sampled. The cell is further characterized by being compact, portable and capable of continuous, accurate measurement of selected trace gas concentrations over an extended time interval by the utilization of different concentrations of the same solution electrolyte in the anode and cathode chambers, the anode and cathode being composed of platinum materials with an improved ion bridge therebetween.

It is therefore an object of the present invention to provide for a novel electrochemical concentration cell for gas analysis which is specifically adapted for use in conducting air pollution studies near ground level and in the upper atmosphere.

It is another object of the present invention to provide for a new and useful method and means for measuring selected trace gas concentrations such as ozone in air by employing different concentrations of the same solution electrolyte in separate anode and cathode chambers linked together by an ion bridge.

It is a further object of the present invention to provide for an electrochemical concentration cell for gas analysis in the form of an integral cell body composed of a solid block of inert material which is relatively inexpensive yet of simple, rugged, highly compact construction and which is readily conformable for portable or non-portable use in measuring trace constituents in fluid mixtures.

It is a still further object of the present invention to provide in an electrochemical concentration cell for a unitary cell body containing separate anode, cathode and reservoir chambers for conducting continuous accurate measurements of trace constituents in a gas over extended time periods.

Broadly, the present invention contemplates construction of a basic electrochemical concentration cell composed of an integral block of inert material in which openings are formed to define separate anode, cathode and reservoir chambers, the anode and cathode chambers being in communication with one another through an ion bridge and the cathode and reservoir chambers being in communication with one another in order to replenish the solution electrolyte in the cathode chamber for continuous, extended-time measurements. In accord with conventional practice, plugs are removably inserted in each of the chambers; and, for the purpose of carrying out meterological or atmospheric testing, the plugs for the anode, cathode and reservoir chambers are provided with slotted air exhaust tubes which in a novel manner minimize loss of the solution electrolyte.

In a preferred application of the concentration cell for use in measuring ozone concentrations of air, the anode and cathode are defined by platinum electrodes immersed in different concentrations of a potassium iodide solution contained in the separate cathode and anode chambers. The ion bridge formed between the chambers effectively retards mixing of the solution electrolytes so as to preserve their relative concentrations in each chamber. In addition, the bridge substantially prevents iodine present in the anode electrolyte from entering the cathode electrolyte. The electrolyte in each chamber may further contain potassium bromide and a buffer, and the same solution electrolyte is placed in the relatively large reservoir chamber which through communication with the cathode chamber automatically maintains a predetermined solution level. As air is introduced into the cell cathode chamber at a predetermined rate of flow, the resultant chemical cell reactions cause a current flow through an external circuit including cathode and anode leads connected to an external load. The current flow rate is directly related to the azone concentration in the air sampled and thus affords an accurate measurement of the ozone concentration.

As a suitable variation of the basic cell for non-portable use, a separate pumping system may be utilized in place of the reservoir chamber to force the solution electrolyte into the cathode chamber at a regulated flow rate, and any excess solution may flow out of the cathode chamber through an overflow tube so that a constant solution level is maintained.

The above and other objects, advantages and features of the present invention will become more readily appreciated and understood from a consideration of the following preferred and alternate forms thereof, when taken together with the accompanying drawings, in which:

FIG. 1 is a perspective view of a preferred form of concentration cell in accordance with the present invention.

FIG. 2 is a sectional view taken about lines 2—2 of FIG. 1.

FIG. 3 is a sectional view taken about lines 3—3 of FIG. 2; and

FIG. 4 is a schematic view of an alternate form of the present invention in which an external pumping system is utilized.

Referring in detail to the drawings, there is shown in FIGS. 1 to 3 an electrochemical concentration cell 10 which is comprised of a cell body 12 composed of a solid block of inert material, such as, Teflon. The cell body 12 is of generally rectangular configuration having flat opposite side surfaces 13, a side surface 14 provided with a groove 14′ and a curved side surface 15. The cell also has top and bottom end surfaces 16 and 16′, and a pair of cylindrical bores are formed for extension through the ends of the cell body in closely spaced parallel relation to one another and to the sides in order to serve as separate cathode and anode chambers 17 and 18, respectively. The chambers 17 and 18 are closed at the bottom by plugs 19 permanently inserted into the lower ends of the bores forming the chambers 17 and 18. A relatively large hole or bore is formed in spaced parallel relation to the chambers 17 and 18 and which defines a reservoir chamber 20. A bottom plug 20′ is inserted also in the bottom of the hole to define the lower terminal end of the chamber. A lateral opening or conduit 22 of limited size extends between the lower ends of the chambers 17 and 18. Into this conduit is tightly inserted an ion bridge 22′ defined by an unfired Vycor glass rod which forms an ion pathway between the chambers but prevents mixing of the cathode and anode electrolytes. Another opening or conduit 23 extends between the reservoir chamber 20 and cathode chamber 17. Into this conduit is loosely inserted a cotton wick 23′ which prevents the formation of air bubbles that might otherwise block solution flow, and retards the exchange of solution between the cathode and reservoir chamber when the cell is tipped during portable operation.

A plug 24 is removably inserted in the upper end of the cathode chamber 17 to define a closure therefor, the plug being fitted with an air input tube 25 and an air exhaust tube 26 in communication with the chamber. In turn, the plug 28 is adapted to be removably inserted in the upper end of the anode chamber 18 and includes an air vent tube 29. Similarly, the reservoir chamber is provided with a closure in the form of a plug 30 which includes an air vent tube 31.

A lateral bore 32 extends through the side wall 15 into the reservoir chamber and is provided with a viewing window in order to visually determine the solution level in the chamber. Cathode and anode leads 34 and 35 extend from the anode and cathode electrodes in their respective chambers for connection to an external load, such as, a microammeter, not shown.

The preferred form of concentration cell is readily portable in that it is lightweight and of unitary, solid construction, and the incorporation of the reservoir chamber 20 in the cell body permits regulated addition of solution electrolyte into the cathode chamber for continuous measurement and analysis over fairly extended periods of time. In the preferred form of concentration cell shown and, as best seen from FIGS. 2 and 3, the cathode electrode 40 and anode electrode 41 are composed of bright platinum gauze, the cathode electrode 40 being a strip of platinum gauze rolled into the form of a scroll to provide a relatively large surface area, and the anode electrode 41 being a substantially smaller strip of platinum gauze rolled in the form of a half cylinder. The cathode and anode electrodes leads 34 and 35 are suitably composed of platinum wires woven directly into the cathode and anode described. In this relation the electrodes may suitably be composed of other selected materials from the platinum family.

In accordance with the present invention, the solution electrolyte for the anode and cathode chambers is made up of different concentrations of a halide solution; and in the preferred form, the electrolyte is either a potassium iodide or sodium iodide solution. For the purpose of illustration and not limitation, the solution electrolyte may be prepared according to the following formulation:

|  | Gms. |
|---|---|
| KI | 10.00 |
| KBr | 25.00 |
| $NaH_2PO_4 \cdot H_2O$ | 1.25 |
| $Na_2HPO_4 \cdot 12H_2O$ | 5.00 |

The solution is mixed with approximately 300 ml. of distilled water and shaken vigorously to dissolve the chemicals, and additional distilled water may be added to make up 650 ml. of solution. The solution electrolyte is poured into the cell reservoir chamber 20 to the level of the viewing window, and the electrolyte passes simultaneously into the cathode chamber through the conduit 23. In turn, one ml. of the solution electrolyte is mixed with 4 gms. of KI crystals and is poured into the anode chamber and permitted to stand for several hours. It will be noted that the concentration of the KI solution in the reservoir and cathode chambers is about 0.1 molal, whereas by the addition of 4 gms. of KI crystals to the anode chamber electrolyte the concentration of that electrolyte becomes about 8.0 molal, although a KI electrolyte concentration within the anode chamber as low as 1.0 molal will render the cell operative. The presence of the different KI electrolyte concentrations in the separate cathode and anode chamber causes a spontaneous internal cell E.M.F. to be formed defined at 25° C. by the equation $$E = \frac{0.0591}{2} \log \frac{(a_1)_{I_3^-}(a_3)^2_{I^-}}{(a_4)_{I_2}(a_2)^3_{I^-}} = C_1 \log \beta$$

where $a_1$ and $a_2$ are the activities respectively related to the concentrations of tri-iodide and iodide present in the anode electrolyte, while $a_3$ and $a_4$ are the activities respectively related to the concentrations of iodide and iodine present within the cathode electrolyte. Upon connection of the external cathode and anode leads to a microammeter, the cell E.M.F. causes the oxidation reaction $3I^-(a_2) \rightarrow I_3^-(a_1) + 2e$ to occur at the anode, and the reduction reaction $I_2(a_4) + 2e \rightarrow 2I^-(a_3)$ to occur at the cathode. Corresponding activities change until the condition $\beta = 1$ is reached which defines a sensitive working equilibrium state for the cell with E.M.F. approximately zero. If then the concentration of $I_2$ in the cathode electrolyte is increased by some method, $\beta$ becomes less than 1, causing the cell E.M.F. to become positive so that iodine molecules in the cathode electrolyte tend to accept electrons from the platinum cathode electrode and are converted to iodide while iodide in the anode electrolyte is forced to give up electrons to the platinum anode electrode and is converted to iodine. The positive current flowing in the cell external circuit is therefore directly related to the rate of conversion of iodine to iodide, or iodide to iodine. Conversely, if a reducing gas species is introduced into the cell cathode electrolyte so as to decrease the concentration of iodine within that electrolyte, $\beta$ will become greater than 1, and a negative current will flow in the cell external circuit.

In sampling air for ozone concentrations, for instance, the air may be forced into the cathode chamber by a non-reactive gas sampling pump, not shown, connected to the air input tube 25, and is bubbled through the electrolyte. As evaporation of the electrolyte occurs, the solution level is maintained by the reservoir chamber and in turn the level of the solution in the reservoir chamber may drop making it necessary from time to time to add distilled water to the solution to raise it to the level of the viewing window. The ozone reacts with the cathode electrolyte according to the equation $$2KI + O_3 + H_2O \rightarrow 2KOH + I_2 + O_2$$

to generate iodine which increases the iodine activity within the cathode electrolyte, renders the cell E.M.F. positive, and causes a current to flow in the external cell circuit that is about proportional to the rate at which ozone enters the cell. The concentration of ozone in the sampled air may then be calculated for the equation $$PPHMV(O_3) = \frac{43.07\, Ti}{PF}$$

where $i$ is the ozone current in microamperes flowing through the cell, and $F$ is the flow rate in milliliters per second of air being sampled at a pressure $P$ millibars and $T°$ K. The result is expressed in parts per hundred million by volume ozone in air.

It will be observed that an elongated slot 46 is formed in the lower end of each of the air vent tubes 26 and 29 for the cathode and anode chambers, and in the air vent tube 31 for the reservoir chamber (not shown) to minimize loss of the solution electrolyte in the cathode chamber due to the bubbling action that occurs when air is forced through the solution, or in the event of boiling that may occur at pressures encountered in upper atmosphere studies. During the bubbling action or above the boiling point, droplets of the solution which are driven upwardly will normally close off the end of the air vent tube and prevent other droplets or projectiles from entering the tube and being exhausted. Futhermore, the droplets traveling in a direction parallel to the elongated slot will not enter the slit and therefore permit the free escape of gas or vapor through the slit from the solution. Moreover, in the event of formation of a film across the lower end of the vent tube, air from the cathode chamber can be exhausted through the elongated slit 46 both above and below the film. The film is therefore not forced into the exhaust tube by air pressure and solution is not lost from the chamber. Still further if the cell should tip or be inverted, the elongated slit, being cut in the lower half of the tube, will now permit loss of solution unless some should reach the slit portion.

The cell of the present invention is also susceptible of longer term, non-portable operation, as shown in FIG. 4, by utilization of a pumping system in place of the reservoir chamber to replenish the solution electrolyte in the cathode chamber. As illustrated, a solution metering pump 55 delivers solution from reservoir 56 over line 57, which includes an iodine scrubber 58, through the cathode plug 24. The line 57 may be defined by a non-reactive Tygon tube and the metering pump regulated to continuously force solution into the cathode chamber at a flow rate approximately ten times that of solution loss rate due to evaporation. Excess solution is removed from the chamber throuhg a separate exhaust tube 60 which empties the excess solution into a waste reservoir 62, and the tube 60 also serves as the air exhaust tube. In this particular application the conduit from the reservoir chamber may be closed off or the reservoir chamber eliminated.

The function of the iodine scrubber 58, which may be composed of several lengths of silver wire or a short length of vulcanized rubber tubing, is to remove free iodine from the solution electrolyte which is formed spontaneously in excess of an equilibrium value within the electrolyte upon storage or due to photochemical action. Without the use of the scrubber, the presence of the free iodine formed in the reservoir 56 will cause the cell to exhibit an erratic background curent of substantial magnitude that renders the cell unsuitable for measuring low gas concentrations.

In general, the cell and tubing material should be inert to, or non-reactive with, the trace gases being sampled as well as with the chemicals in the solution electrolyte, and preferably for this purpose the cell and tubing are composed of a polytetrafluorethylene material, such as Teflon. The bridge 43 should also be inert to the chemicals or solution electrolyte, and an asbestos fiber packing or cotton string encased in a Tygon tube may serve as the ion bridge as well as the Vycor glass rod described in the preferred form.

While preferred and alternate embodiments the invention have been disclosed herein for the purpose of illustration, it will be understood that various changes may be made in the particular form, details and arrangement and proportions of various parts and combinations of such embodiments without departing from the spirit of the present invention.

What is claimed is:

1. A portable electrochemical concentration cell comprising:
   a cell body composed of a chemically inert material provided with closely spaced, parallel bores extending the substantial length of the body to define anode and cathode chambers therein and a conduit for an ion bridge extending between said anode and cathode chambers,
   an electrode disposed in each of said chambers, each having electrode leads extending through a side of said body, each of said electrodes being immersed in a solution electrolyte in each of said respective chambers,
   a relatively large bore in said body defining a reservoir chamber containing a solution electrolyte and being in open communication with the bore defining the cathode chamber to maintain a predetermined solution therein, and
   a closure for each of said anode and cathode chambers having an exhaust tube, each exhaust tube being provided with an elongated slot adjacent to its lower end projecting within said chamber.

2. An electrochemical concentration cell according to claim 1, each of said anode and cathode chambers having a platinum electrode defined by a strip of platinum gauze, and each of said anode and cathode chambers being partially filled with corresponding solution electrolytes of different concentrations.

3. An electrochemical concentration cell for gas analysis comprising:
   separate anode and cathode chambers with an ion bridge extending between said chambers,
   an electrode disposed in each of said anode and cathode chambers, each electrode composed of the said material,
   an iodide solution electrolyte in each of said anode and cathode chambers, said solution electrolytes having sufficiently different iodide ion concentrations to generate a stable internal E.M.F. between said electrodes without an external voltage source, the concentration of the iodide in the cathode chamber being about 0.1 molal while the concentration of the iodide in the anode chamber is within the range of 1.0 to 8.0 molal, delivery means for introducing gas to be analyzed into the solution electrolyte in said cathode chamber, and current measuring means electrically interconnected between said electrolytes to measure the magnitude of current flow in response to the chemical reaction within the cell.

4. An electrochemical concentration cell according to claim 3, said solution electrolyte being selected from the group consisting of buffered or unbuffered potassium iodide and sodium iodide solutions.

5. An electrochemical concentration cell according to claim 3, each of said electrodes being in the form of platinum gauze having platinum wire leads connected to said current measuring means.

6. An electrochemical concentration cell according to claim 3, further including a reservoir chamber containing the solution electrolyte and being in communication with said cathode chamber to maintain a predetermined solution level in said cathode chamber.

7. A portable electrochemical concentration cell according to claim 3, further including an input line and means for pumping solution electrolyte into said cathode chamber at a predetermined rate of flow exceeding the rate of evaporation of the solution electrolyte therein, and a waste duct communicating with said cathode chamber to remove excess solution electrolyte above a predetermined solution level therein.

8. A portable electrochemical concentration cell according to claim 7, further including an iodine scrubber in the solution input line for removing free iodine from the solution prior to introduction of the solution into said cathode chamber.

9. A portable electrochemical concentration cell for measuring ozone concentrations in air comprising:

a unitiary cell body containing separate anode and cathode chambers and a reservoir chamber in communication with said cathode chamber, platinum electrodes each defined by a strip of platinum gauze inserted in each of said anode and cathode chambers, an iodide solution electrolyte in each of said anode and cathode chambers having sufficiently different iodide ion concentrations to generate a stable internal E.M.F. between said electrodes without an external voltage source, the concentration of the iodide in the cathode chamber being about 0.1 molal while the concentration of the iodide in the anode chamber is within the range of 1.0 to 8.0 molal, an air inlet tube communicating with said cathode chamber for introduction of air to be sampled therein, and current measuring means electrically interconnected between said electrodes to measure the magnitude of current flow in response to the chemical reaction within the cell.

10. A portable electrochemical concentration cell according to claim 9 further including an ion bridge in the form of a porous glass rod disposed in an opening extending between said anode and cathode chambers to define an ion pathway therebetween.

References Cited
UNITED STATES PATENTS

| | | | |
|---|---|---|---|
| 2,732,335 | 1/1956 | Glass | 204—195 |
| 3,001,917 | 9/1961 | Scheirer | 204—195 |
| 3,236,759 | 2/1966 | Robinson | 204—195 |
| 3,315,270 | 4/1967 | Hersch | 204—195 |
| 3,329,599 | 7/1967 | Brewer | 204—195 |

TA-HSUNG TUNG, Primary Examiner

U.S. Cl. X.R.

204—1 T

UNITED STATES PATENT OFFICE
CERTIFICATE OF CORRECTION

Patent No. 3,681,228                   Dated 1 August 1972

Inventor(s) Komhyr, Walter D.

It is certified that error appears in the above-identified patent and that said Letters Patent are hereby corrected as shown below:

Line 3, column 3, cancel "azone" and substitute -- ozone --

Line 60, column 5, cancel "now" and substitute -- not --

Line 74, column 5, cancel "throuhg" and substitute -- through --

Signed and sealed this 9th day of January 1973.

(SEAL)
Attest:

EDWARD M. FLETCHER, JR.                ROBERT GOTTSCHALK
Attesting Officer                      Commissioner of Patents